United States Patent [19]
Yuan et al.

[11] Patent Number: 6,013,146
[45] Date of Patent: Jan. 11, 2000

[54] REINFORCED FRICTION MATERIAL

[75] Inventors: Yongbin Yuan, Winchester; Stanley Frank Kulis, Jr., White Post; Timothy Franklin Merkel, Winchester, all of Va.

[73] Assignee: Moog Automotive Products, Inc., St. Louis, Mo.

[21] Appl. No.: 09/149,999

[22] Filed: Sep. 8, 1998

Related U.S. Application Data

[60] Division of application No. 08/636,151, Apr. 22, 1996, Pat. No. 5,861,203, which is a continuation-in-part of application No. 08/262,015, Jun. 17, 1994, abandoned.

[51] Int. Cl.[7] .................................................. C03B 29/00
[52] U.S. Cl. .................... 156/89.22; 156/242; 156/279.5
[58] Field of Search .................................... 428/66.2, 116, 428/117, 118; 156/197, 89.22, 242, 275.5

[56] References Cited

U.S. PATENT DOCUMENTS

| | | | |
|---|---|---|---|
| 3,639,197 | 2/1972 | Spain | 428/37 |
| 3,759,353 | 9/1973 | Marin | 428/66.2 |
| 4,278,153 | 7/1981 | Venkatu | 428/117 X |
| 4,373,038 | 2/1983 | Moraw et al. | 428/66.2 X |
| 4,418,115 | 11/1983 | Lannou | 428/66.2 X |
| 5,083,643 | 1/1992 | Hummel et al. | 428/66.2 X |
| 5,413,194 | 5/1995 | Kulis, Jr. et al. | 428/66.2 X |
| 5,861,203 | 1/1999 | Yuan et al. | 428/117 |

*Primary Examiner*—Timothy M. Speer
*Attorney, Agent, or Firm*—Thomas S. Baker, Jr.

[57] ABSTRACT

An improved reinforced friction material is comprised of a cured friction material mixture of friction particles, filler particles, and binder particles, and has a embedded honeycomb core reinforcement whose individual cells are filled with and bonded at the cell walls to the cured friction material mixture by a novel manufacturing method.

6 Claims, 5 Drawing Sheets

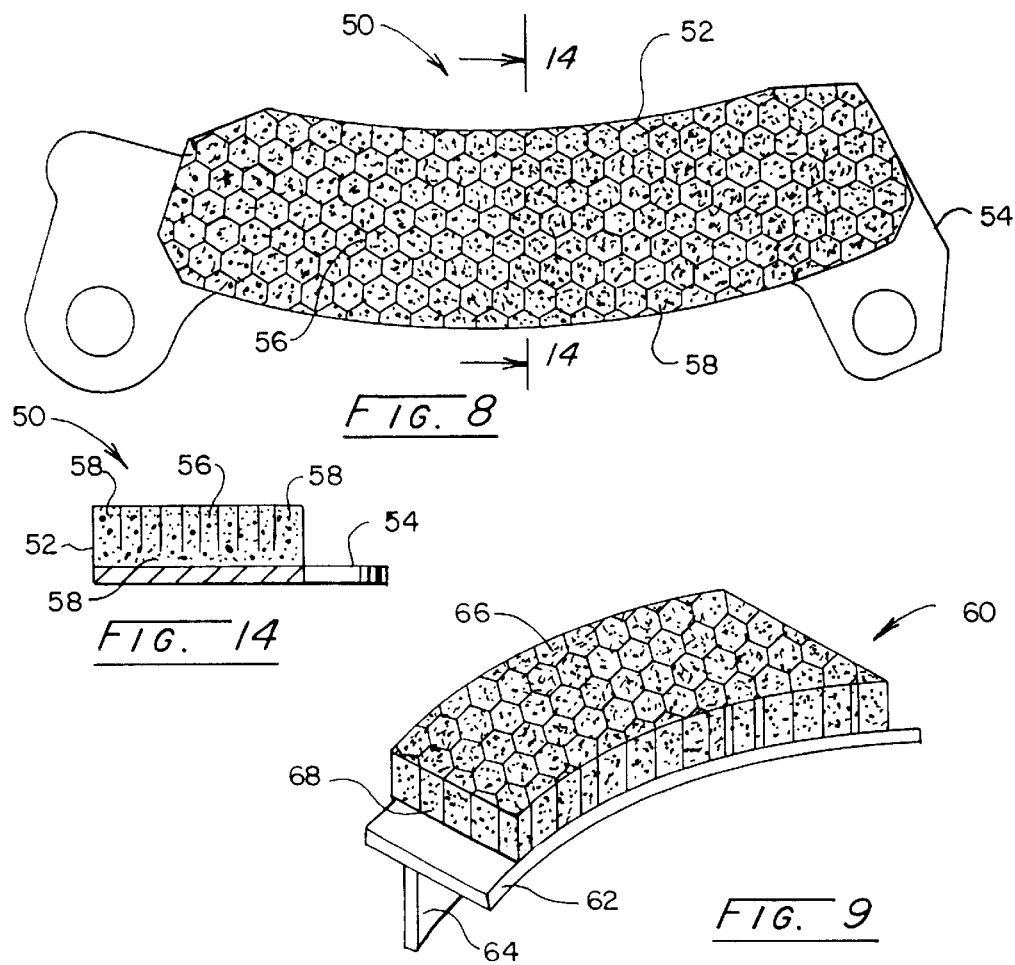

REINFORCED FRICTION MATERIAL

CROSS-REFERENCES

This is a division of application Ser. No. 08/636,151 filed Apr. 22, 1996 now Pat. No. 5,861,203 which is a Continuation-In-Part of application Ser. No. 08/262,015 filed Jun. 17, 1994 now abandoned.

FIELD OF THE INVENTION

This invention relates generally to friction materials useful for incorporation in various brake assemblies and other friction-producing devices, and particularly concerns novel friction materials having an embedded honeycomb core for reinforcement.

BACKGROUND OF THE INVENTION

The use in automobiles and other transport vehicles of various braking devices such as drum brake assemblies, disc brake assemblies, and the like is well-known. Such devices function to retard or stop vehicle motion, often from high velocities and at high rates of vehicle deceleration. In the braking process much or very nearly all of the vehicle's kinetic energy is converted to frictional heat at the surfaces of the friction material or materials incorporated in the vehicle braking devices. Such braking process also frequently results in very high operating temperatures being developed in the friction material or materials.

Friction materials incorporated in the known braking devices have generally utilized discrete reinforcement fibers or continuous reinforcement filaments for material reinforcement purposes, and often with a compromise as to one or more of the material's qualities of wear-resistance, developed braking noise, and release of fiber debris. U.S. Pat. No. 3,639,197 issued in the name of Spain, for instance, discloses the use of both continuous carbon filaments and randomly-oriented short carbon fibers as reinforcements in the rotor and stator composites of an aircraft brake assembly.

U.S. Pat. No. 3,759,353 issued in the name of Marin teaches the use of both circumferentially-wound carbon filament and woven carbon filament cloth reinforcements in a disc brake friction disc composite structure.

U.S. Pat. No. 4,278,153 issued in the name of Venkatu discloses a brake disc construction having a copper or copper-plated metal honeycomb core reinforcement that is filled with a powdered friction material, normally comprised of powdered metals and including powdered copper. The powdered friction material is subsequently sintered at an elevated temperature in the range of 1,800 to 2,000 degrees Fahrenheit to form a unitary structure that is made up essentially of single phase, metal-to-metal bonded material resulting from solid state fusion of the mass.

U.S. Pat. No. 4,373,038 issued in the name of Moraw et al. teaches an asbestos-free friction material useful for brake linings, clutches, etc. and comprising a combination of discrete aramide fibers, mineral fibers, and steel fibers reinforcing a hardenable binder.

U.S. Pat. No. 4,384,640 issued in the name of Trainor et al. discloses a friction composition wherein aramid fibers only, sometimes in continuous filament form and sometimes in discrete fiber form, are utilized as reinforcements in the fabrication of various brake or clutch components.

U.S. Pat. No. 4,418,115 issued in the name of Le Lannou teaches a friction lining material for use in brakes, clutches, and other applications having both mineral fibers and organic fibers as reinforcements in a mixture having fillers and a binder. The organic fibers are at least partially composed of a cross-linkable, fusible type such as acrylic or modacrylic fibers.

U.S. Pat. No. 4,997,067 granted in the name of Watts also teaches a friction material for brakes, clutches, etc. wherein the reinforcing medium is a woven fabric that includes fluorine (polytetrafluoroethylene) fibers in yarn form. See also U.S. Pat. No. 3,365,041 granted in the name of Stormfeltz for a friction clutch teaching of the earlier conventional use of both asbestos fibers and glass fibers in a woven reinforcing fabric that is embedded in a friction material composition having also fillers and phenol formaldehyde resin binder.

As to teachings concerning noise reduction in a braking device, see U. S. Pat. No. 5,083,643 issued in the name of Hummel et al. and assigned to the assignee of this invention. The friction material disclosed therein incorporated reinforcement fibers which are more particularly described as being glass fibers, rock wool fibers, processed mineral fibers, or refractory material fibers.

Also, see U.S. Pat. Nos. 3,673,058 and 3,790,654 issued in the names of Jackson et al. and Bagley, respectively, for disclosures of apparatus and methods for manufacturing honeycomb core materials.

Our invention offers performance advantages over the friction materials referenced above, particularly with respect to resonance noise reduction, increased wear resistance, more consistent friction material performance, and minimizing release of fiber debris. Other advantages will become apparent from a careful consideration of the described invention and of the method of friction material fabrication or manufacture that is detailed and claimed.

SUMMARY OF THE INVENTION

In order to achieve the objectives of this invention we provide a vehicle brake assembly or the like with one or more cooperating brake friction elements (e.g., a disc brake friction pad or a drum brake friction shoe) fabricated to include an improved reinforced friction material. The improved reinforced friction material, which is typically fiber-free or contains relatively small amounts of discontinuous fibers in order to obtain desired frictional and wear characteristics is appreciably carbonaceous in nature. It is comprised of a cured mixture of friction modifier particles, filler particles, a polymer resin binder, and an embedded reinforcing core. The reinforcing core eliminates the need for discrete reinforcement fibers or continuous reinforcement filaments within the friction material. Some of the mixture particles may also accomplish a special function such as lubrication. The friction material reinforcing core, which has multiple, adjoining, open-ended cells, is embedded in the particle or powdered mixture during brake element friction material fabrication in a manner whereby, following polymerization of the friction material polymer resin binder, the reinforcing core cells are completely filled with the cured mixture being bonded to the cell walls. Examples of the carbonaceous particles utilized include graphite particles, carbon black particles, coke particles, and rubber particles. Examples of useful filler particles include metal particles, metal oxide particles, and baryta and other mineral particles. Examples of useful reinforcing core materials include expanded aluminum honeycomb core, welded steel honeycomb core, glass fiber-reinforced phenolic resin honeycomb core, and like expanded core materials. Examples of discontinuous fibers used to modify frictional or wear characteristics within the friction material mixture include steel wool, carbon, milled glass, mineral, fiberglass and Kevlar fibers.

It is also believed that the reinforced friction material of this invention may also have advantageous application to the manufacture of clutch mechanism friction components, and to use applications other than automotive.

Throughout the drawings and description which follow, frequent illustration and reference will be made to reinforcing cores having adjoining, open-ended core cells with a hexagonal cell cross-sectional configuration as being reinforcing honeycomb cores. The term as used in this application is intended to include reinforcing cores with adjoining, open-ended cells of different cross-sectional configurations such as square, rectangular, triangular, trapezoidal, rhomboidal, and the like cross-sectional (planform) configurations.

DESCRIPTION OF THE DRAWINGS

FIG. 8 is a plan view of an alternate form of disc brake friction pad assembly also having the improved friction material of this invention incorporated therein;

FIG. 9 is a perspective view of a drum brake friction shoe assembly having the friction material of this invention incorporated therein;

FIGS. 10 through 13 illustrate different cell cross-sectional geometries produced during the manufacture of known honeycomb core materials;

FIG. 14 is a sectional view taken along line 14—14 of FIG. 8;

DETAILED DESCRIPTION

Figure 1:
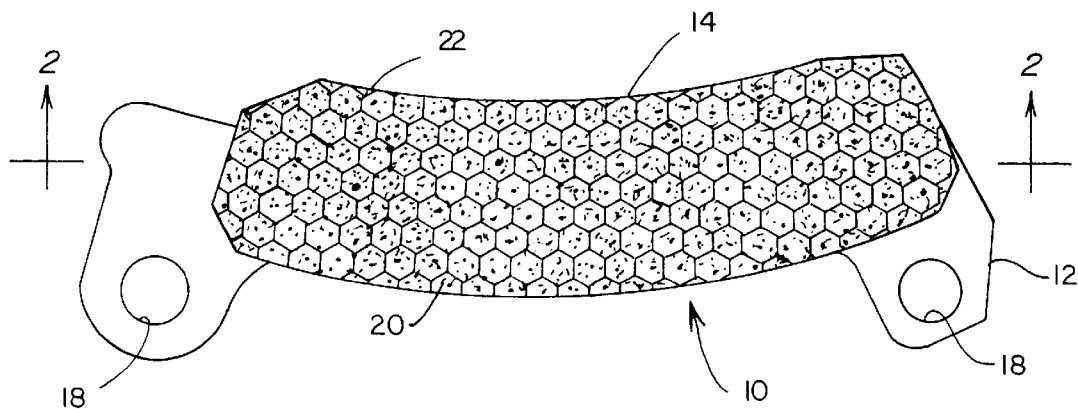
FIG. 1 is a plan view of a disc brake friction pad assembly having a preferred embodiment of the improved friction material of this invention incorporated therein.
Figure 2:
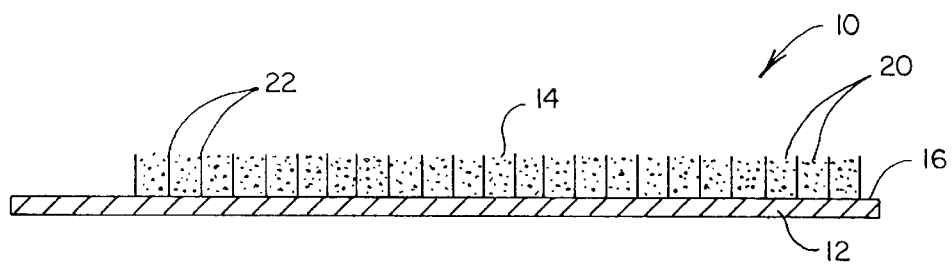
FIG. 2 is an elevational view taken along line 2–2 of FIG. 1.
Figure 3:
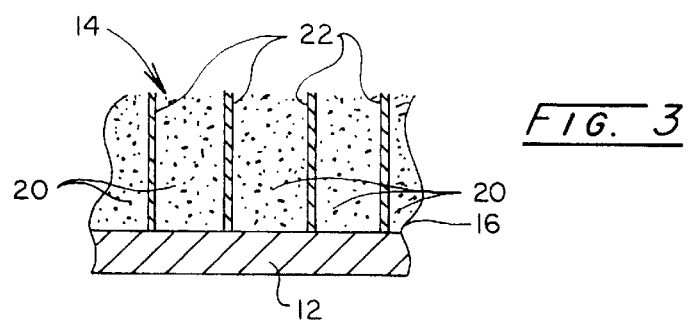
FIG. 3 is an enlarged view of a portion of FIG. 2.

FIGS. 1 and 2 illustrate, in plan and in elevation, respectively, an automobile disc brake friction pad assembly 10 comprised of a base plate component 12 and friction pad component 14 securely bonded to the base plate component by a suitable adhesive 16 such as an epoxy adhesive. Base plate component 12 typically is a steel stamping and also is typically provided with mounting holes 18 for use in incorporating the friction pad assembly 10 into an automobile wheel disc brake installation. Friction pad component 14 is fabricated of the improved friction material of this invention, and is essentially comprised of a heat-cured, friction particle, filler particle, and binder particle mixture with an embedded reinforcement core. In the drawings the heat-cured friction material mixture is designated 20 and the embedded reinforcement core is designated 22. Although this description refers to a heat-cured friction material, it should be noted that the binder utilized in the friction material may be non-heat curable. For example, some binders cure at ambient temperature.

It should be noted from details in the drawings that reinforcement core 22 is in all cases constructed of multiple, adjoining, open-ended cells. However, the cells may have different cross-sectional geometries depending upon the applicable method of honeycomb reinforcing core manufacture. In many instances a hexagonal cell cross-section planform is preferred. (See FIGS. 1, and 8 through 10, for example). Other available core cell cross-sectional configurations are illustrated and described in connection with FIGS. 11 through 13. In general we presently prefer honeycomb reinforcement cores made of aluminum alloy, fiberglass reinforced phenolic, aramid reinforced with phenolic or epoxy, fiber-glass reinforced polyimide, carbon fiber-reinforced polyimide, thermoplastics, thermosets, mineral, ceramics, metal or metal alloy, or combinations of the aforementioned materials or other comparable materials. Such cores normally have a bulk (expanded) density of approximately 2 pounds per cubic foot or greater. In some cases core density, as determined by applicable cell size, cell wall thickness, and cell wall material, may extend to as much as approximately 20 pounds per cubic foot for an expanded carbon fiber-reinforced polyimide material having 3/16 inch wall-to-wall, open-ended cells. It should be noted that we prefer honeycomb reinforcement cores in which the cell walls are spaced apart a distance ranging between about 1/16 inch and about 1 inch. If the walls define circular cells we prefer the cells to have a diameter ranging between about 1/16 inch and 1 inch. Also, generally the ratio of the weight of the expanded honeycomb reinforcement core to the total weight of the reinforced friction material is in the range of approximately 5% to 20%. Such compares favorably also to conventional fiber-reinforced friction materials and continuous filament-reinforced friction materials wherein the weight of the fibrous reinforcement alone generally exceeds 20% of the total weight of the friction material.

Figure 4:
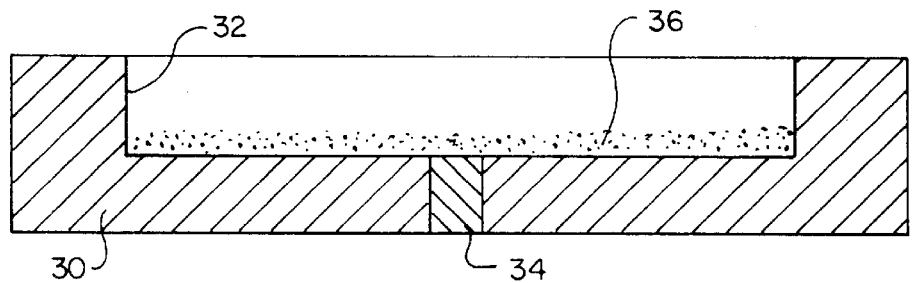
FIGS. 4 through 7 are schematic sectional views of compression molding apparatus at successive stages of use in the manufacture of friction material structured in accordance with our invention.

A preferred method for embedding the selected reinforcement core in the friction material matrix is illustrated schematically in FIGS. 4 through 7 of the drawings. As shown in FIG. 4, a lower mold half 30 having a cavity 32 and ejector pins 34 is preferably preheated to a temperature of approximately 320 degrees Fahrenheit and a conventional release agent is applied as a coating to cavity 32. Cavity 32 has a planform shape and size that conforms to the shape and size of the friction material component that is to be fabricated. Next, approximately forty percent (40%) of the required powdered mixture 36 necessary to produce the fabricated part is placed in cavity 32 and distributed evenly. It should be noted that if the powdered mixture 36 contains some discontinuous fibers to obtain desired frictional or wear characteristics the fibers preferably should have a length of no more than about one fourth the distance between opposing cell walls or the diameter of circular cells.

Figure 5:
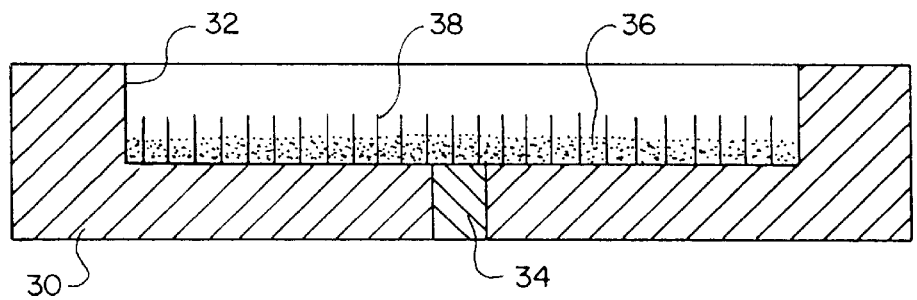
Figure 6:
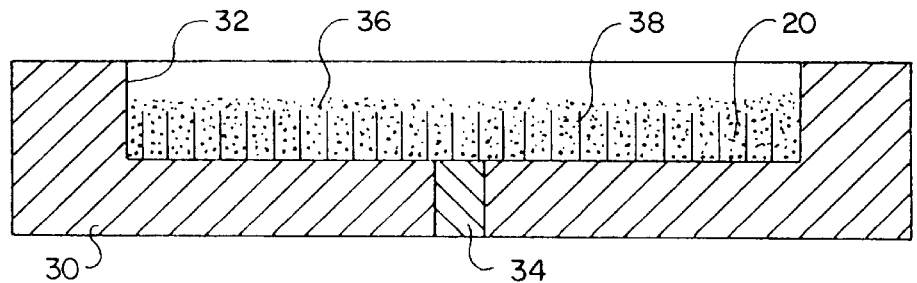

FIG. 5 illustrates the next process step involving the placing of a pre-cut and expanded honeycomb reinforcement core 38 within mold cavity 32 and with honeycomb core 38 penetrating the distributed mixture 36 until contacting the lower surface of the mold cavity. Basically, the axes of the core cells are oriented at right angles to the lowermost surface of cavity 32. Afterwards the manufacturing process is continued by placing the remainder of the required powdered mixture 36 necessary to produce the fabricated part in mold cavity 32 and distributing it evenly over honeycomb reinforcement core form 38 to thus completely fill all of the core cells. See FIG. 6.

Figure 7:
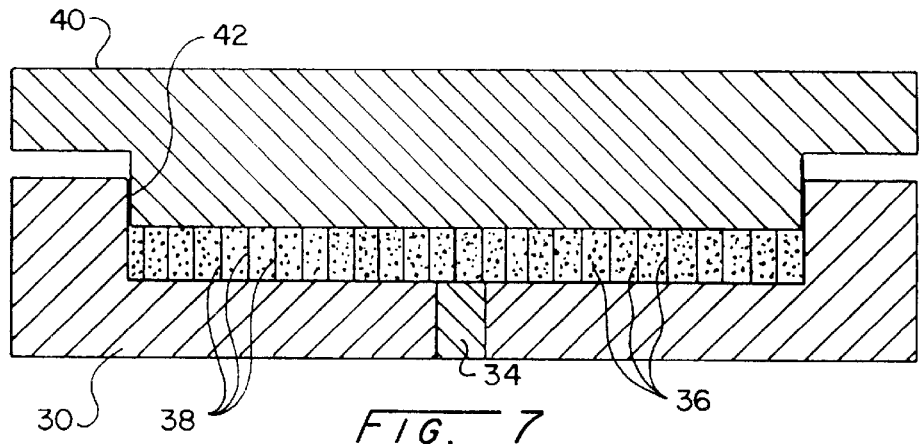

As shown in FIG. 7, the mold upper half 40, also preferably pre-heated to approximately 320 degrees Fahrenheit, is next assembled to lower mold half 30 causing the lower surface of upper mold half punch feature 42 to contact the distributed full quantity of mixture 36 and cause it to become compressed. We prefer that the compression forces applied to mold halves 30 and 40 be sufficient to generate an isostatic compression pressure of approximately 600 pounds per square inch throughout mixture 36.

Next the interior of filled cavity 32 is vented to the atmosphere at 1-minute, 2-minute, and 3-minute elapsed times following initial compression. Thereafter, the compression forces are preferably increased to a level that will produce an isostatic compression pressure of approximately 1200 pounds per square inch in the compressed mixture and that level of compression is preferably maintained for a period of at least approximately 2 minutes.

Lastly, the so-compressed and partially heated pre-form is next ejected from the mold assembly using ejector pins 34 and is subsequently transferred to a curing oven. In the oven the part is heat cured by raising the friction material temperature linearly to approximately 300 degrees Fahrenheit over a 3 hour period and then maintaining the heated pre-form at the 300 degree Fahrenheit temperature for an additional 4 hours of process time. After cooling to ambient temperature the fabricated friction material form is ready for subsequent incorporation into the braking device or the like component for which it is intended.

Figure 15:
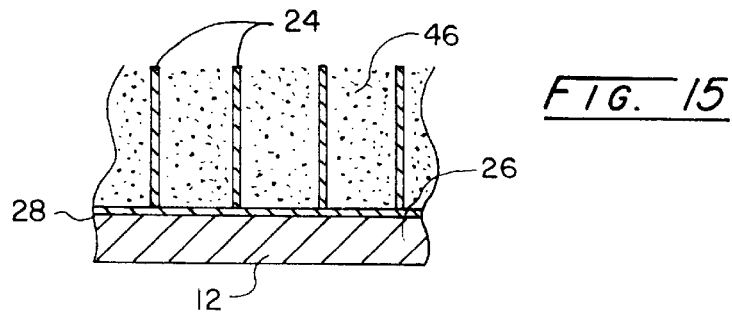
FIG. 15 is a sectional view illustrating an alternate embodiment of a honeycomb core.

An alternate honeycomb core reinforcement 24 may be seen by referring to FIG. 15. Core 24 has adjoining, open ended cells defined by walls the same as core 22 depicted in FIGS. 1 through 9. Core 24 also has a facing sheet 26 attached to one end of its cell walls. Sheet 26 provides additional rigidity for reinforcement core 24.

Figure 16:
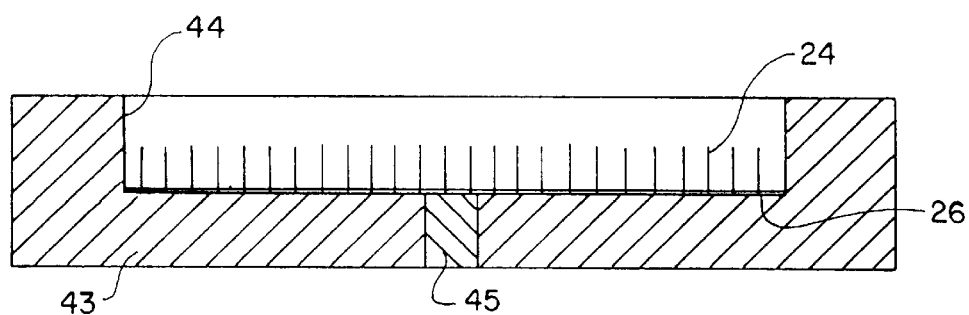
FIGS. 16 through 18 are schematic sectional views of compression molding apparatus at successive stages of use in the manufacture of frictional material structured utilizing the honeycomb core reinforcement depicted in FIG. 15.
Figure 17:
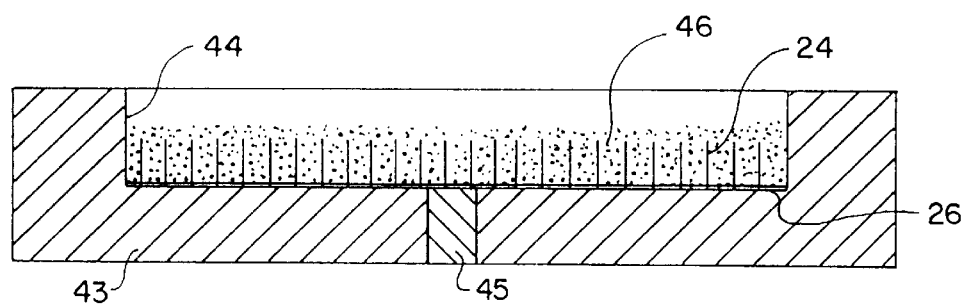
Figure 18:
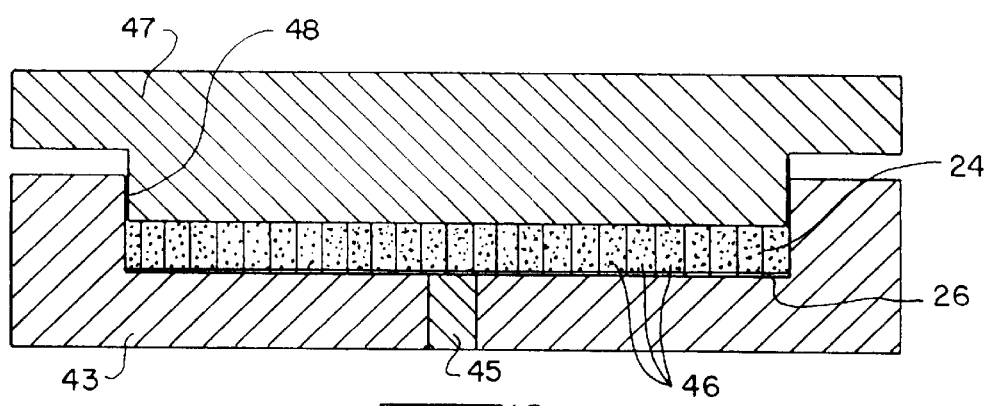

A method for embedding the alternate honeycomb reinforced core 24 depicted in FIG. 15 in a friction material matrix is illustrated schematically in FIGS. 16 through 18. As shown in FIG. 16, a lower mold half 43 having a cavity 44 and ejector pins 45 preferably is heated to a temperature of approximately 320 degrees Fahrenheit and a conventional release agent is applied as a coating to cavity 44. Cavity 44 has a planform shape and size that conforms to the size and shape of the friction material component that is to be fabricated. Thereafter, reinforcement core 24 is placed in cavity 44 with facing sheet 26 engaging the bottom of cavity 44. Thereafter, the manufacturing process if continued by placing the required friction material mixture 46 necessary to produce the fabricated part in mold cavity 44 and distributing it evenly over honeycomb reinforcement core 24 to thus completely fill all of the core cells. See FIG. 17.

Turning to FIG. 18, it may be seen that upper mold half 47, also preferably preheated to approximately 320 degrees Fahrenheit, is next assembled to lower mold half 43 causing the lower surface of upper mold half punch feature 48 to contact the distributed full quantity of mixture 46 and cause it to become compressed. Preferably the compression forces applied to hold halves 43 and 47 are sufficient to generate an isostatic compression pressure of approximately 600 pounds per square inch throughout mixture 46.

Next the interior of filled cavity 44 is vented to the atmosphere at one minute, two minute and three minute elapsed times following initial compression. Thereafter, the compression forces are preferably increased to a level that will produce an isostatic compression pressure of approximately 1200 pounds per square inch in the compressed mixture and that level of compression is preferably maintained for a period of approximately two minutes. Lastly, the so-compressed and partially cured part is next ejected from the mold assembly using ejector pins 45. Subsequently the part is transferred to a curing oven to be heat-cured by raising the friction material temperature linearly to approximately 300 degrees Fahrenheit over a three hour period and then maintaining the heated part at the 300 degree Fahrenheit temperature for an additional four (4) hours of process time. After cooling to ambient temperature the fabricated friction material part is ready for finishing and subsequent incorporation into a braking device or like component for which it is intended.

In Table 1 below we provide details of three examples of friction material matrix compositions that have been utilized in the fabrication of our improved reinforced friction materials having an embedded honeycomb core reinforcement 22 and 24. The mixture designated "Mix 1" has, when cured, a friction level suitable for avoiding thermal fade when used with glass fiber-reinforced composite honeycomb cores having an expanded density greater than about 8 pounds per cubic foot. The mixture designated "Mix 2" is satisfactory for use with honeycomb cores fabricated of sheet or foil aluminum (e.g., 5052 wrought aluminum alloy) and having an expanded density of at least about 5 pounds per cubic foot. The mixture designated "Mix 3" includes some discontinuous carbon fibers which are desirable where increased wear or fade resistance is required. This mixture is suitable for use with glass fiber reinforced composite honeycomb cores having an expanded density greater than about 8 pounds per cubic foot. It has been found that where discontinuous fibers are added to a powdered mixture in the manufacture of a friction material part the fiber length preferably should be less than about one fourth the distance between opposing wall cells or of the diameter of the cells if they are round to ensure good fill of the honeycomb core cells. If the preferred fiber length is utilized good fill of the core cells will occur regardless of the percentage of discrete discontinuous fibers added to the mixture. All constituent values are given on a percentage parts by weight basis.

TABLE 1

| Constituent | Mix 1 | Mix 2 | Mix 3 |
| --- | --- | --- | --- |
| Graphite Particles | 5.32 | 6.14 | 4.93 |
| Brass Chips and Particles | 2.39 | 2.76 | 2.21 |
| Cashew Nut Shell Resin Particles | 5.46 | 8.52 | 5.06 |
| Carbon Black Particles | 1.30 | 1.50 | 1.21 |
| Rubber Peel Particles | 5.56 | 8.52 | 5.15 |
| Coke Particles | 19.43 | 15.16 | 18.01 |
| Barite Particles | 46.23 | 36.47 | 42.86 |
| Aluminum Oxide Particles | 3.46 | 0.25 | 3.21 |
| Phenolic Resin Particles | 10.85 | 20.68 | 10.05 |
| Short Carbon Fibers | 0.00 | 0.00 | 7.31 |
| Total | 100.00 | 100.00 | 100.00 |

In dynamometer testing of various honeycomb core-reinforced friction materials it was observed that certain disc pad components incorporating honeycomb core reinforcements having an expanded density of less than about 5 pounds per cubic foot sometimes exhibited a tendency toward hairline cracking. To overcome the hairline cracking problem, we originated a hybrid disc brake pad in which the friction material with honeycomb core reinforcement is bounded at its planform edges and on one face by a different but compatible friction material. FIG. 8 illustrates the resulting hybrid disc brake friction pad assembly 50 in which the friction pad component 52 bonded to steel base plate component 54 has an inwardly-situated principal friction material area 56 fabricated with an embedded low-density honeycomb core inserted within a cup or walled receptacle 58 of compatible friction material area. The friction material area 56 may or may not be centered within the pad component 52. Indeed, friction material area 56 may be laterally or longitudinally offset in pad component 52 and may occupy a relatively small portion of the total area of pad component 52. The compatible friction material may or may not have a high thermal conductivity.

If a high thermal conductivity is desired, a semi-metallic material may be utilized for the receptacle. Fabrication of a hybrid disc brake friction pad assembly having a central friction material area 56 fabricated with an embedded honeycomb core and encased in a walled receptacle 58 may be accomplished utilizing the following described process. A first mold for fabrication of the central material area 56 is heated to a temperature of approximately 230 degrees Fahrenheit. Next, approximately forty percent (40%) of the required powdered mixture for the central friction material area 56 is placed in the lower mold cavity and distributed evenly. Thereafter, a pre-cut and expanded honeycomb reinforcement core is inserted into the lower mold cavity with the honeycomb core penetrating the distributed mixture until contacting the lower surface of the lower mold cavity. Subsequently, the remainder of the required powdered mixture necessary to produce the central area 56 is placed in the lower mold cavity and distributed over the honeycomb reinforcement core form to completely fill the core cells. Thereafter the mold upper half is assembled to the lower mold half causing the lower surface of the upper mold half punch to contact the full quantity of mixture and cause it to be compressed. A compression force of approximately 200 pounds per square inch is applied for approximately three minutes to make the preform. This process is identical to that described previously in FIGS. 4 through 7.

Figure 19:
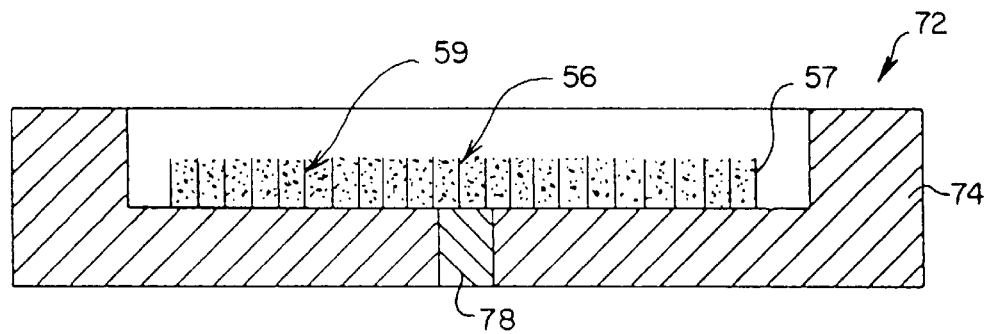
FIGS. 19 through 21 are schematic sectional views of compression molding apparatus at successive stages of use in the manufacture of frictional material structured utilizing the honeycomb core reinforcement depicted in FIG. 8.
Figure 20:
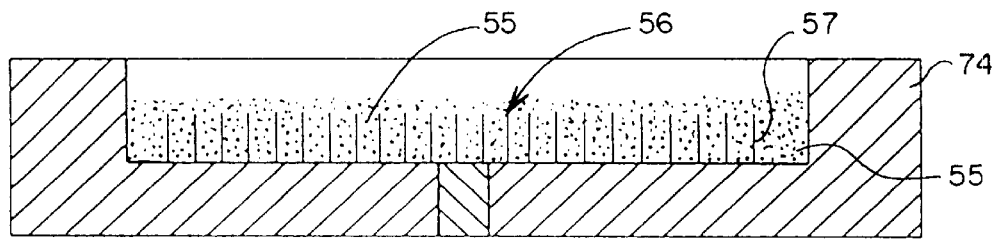
Figure 21:
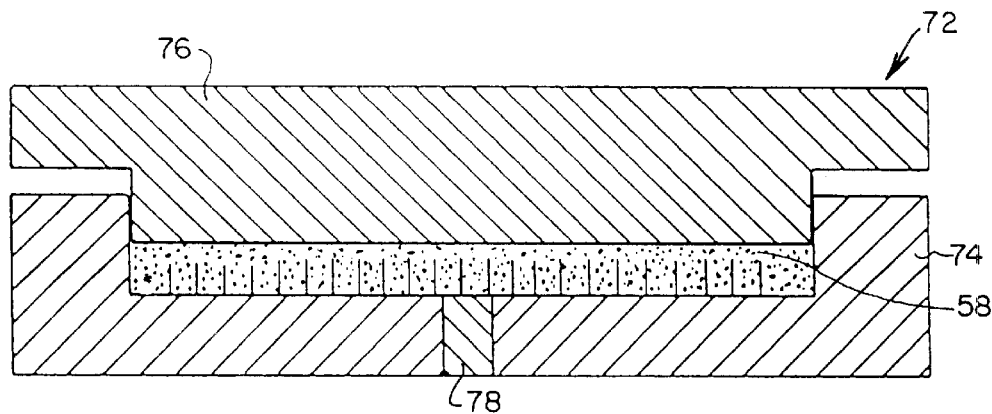

Thereafter, the so-made central friction material area 56 is removed from the first mold. Subsequently, the central friction material area 56 is placed in a second mold assembly 72 having a planform of the final pad as may be seen by referring to FIGS. 19 through 21. This mold 72 is preheated to a temperature of 320 degrees Fahrenheit. The area 56 is inserted into the central portion of the lower mold half 74 of the second mold and the mixture 55 comprising the walled receptacle 58 is distributed evenly along the perimeter 57 of the area 56 and across the top surface 59 of the area 56. Subsequently, the mold upper half 76 is assembled to the mold lower half 74 to cause a compression force to be applied to the central area 56 and the mixture 55 forming the walled receptacle 58. Preferably a compression force of approximately 1200 pounds per square inch is applied to a second mold for a minimum period of two minutes. Thereafter the so compressed and partially cured part is ejected by pins 78 from the second mold assembly 72 and transferred to a curing oven where it is heat cured.

An example of a satisfactory semi-metallic, non-reinforced friction material is given in the Table 2 which follows as "Mix 4". Again, all constituents are stated on a percentage parts by weight basis.

TABLE 2

| Constituent | Mix 4 |
| --- | --- |
| Mineral Particles | 9.0 |
| Rubber Peel Particles | 1.0 |
| Coke Particles | 4.0 |
| Ferrous Particles | 57.0 |
| Graphite Particles | 17.0 |
| Phenolic Resin Particles | 12.0 |
| Total | 100.0 |

In all cases the basic matrix formed from the mixture components, including organic, inorganic, and metallic constituents, are held together by an organic thermosetting polymer system (e.g., phenolic resin). The polymer binder melts, flows, and forms a three-dimensional network among the constituents utilizing co-valent bonds. In addition, electrostatic bonding plays a smaller part in the bonding process of the matrix. The binder resin system bonds directly to reinforcement cell walls causing the fiber honeycomb core material to be the primary reinforcing material.

In the new reinforced friction material construction the honeycomb core material constitutes the product continuous phase with the polymer binder being the discontinuous phase. In comparison, in a conventional non-asbestos fiber, non-metallic fiber friction material the reinforcing fibers constitute a discontinuous phase held together by a continuous phase binder. The advantages of the new system include increased three-dimensional structural strength or rigidity in comparison to the known polymer-bound friction materials.

FIG. 9 illustrates the present invention as applied to a drum brake friction shoe assembly designated 60. Assembly 60 includes an arcuate shoe table 62 joined to and supported by perpendicular shoe web 64. A friction shoe component 66, having an arcuate under surface that corresponds to and mates with the upper surface of arcuate shoe table 62, is secured to the upper surface of shoe table 62 by an interface adhesive 68. Other known fastening techniques, such as the use of rivets or the like, may be utilized to join friction shoe 66 to shoe table 62 in preference to use of an adhesive. In the FIG. 9 brake shoe construction it is important that friction shoe 66 be fabricated using the reinforced friction material of our invention. The presence of the embedded honeycomb core reinforcement in the friction material matrix is clearly shown in FIG. 9.

FIGS. 10 through 13 are provided in the drawings to illustrate some of the different cell cross-sectional geometries that are obtainable in commercially available honeycomb core reinforcement materials. The illustrated honeycomb core fragments are designated 70, 80, 90, and 100, respectively. Generally, we prefer to use honeycomb cores with core cell sizes in the range from as little as approximately 1/16 inch (minimum distance measured from cell wall to opposite cell wall in the expanded condition) to as much as 1 inch. Also, as previously indicated, we basically prefer to define the incorporated or embedded honeycomb reinforcement core in terms of its bulk (expanded) density which typically ranges from as little as approximately 2 pounds per cubic foot to as much as approximately 20 pounds per cubic foot and which is very much influenced by the core cell wall thicknesses, by the density of the particular material from which the core cells are configured, and by the core cell cross-sectional dimensions.

The new reinforced friction material of this invention preferably does not contain fibers, either discontinuous or continuous, as a reinforcement. This is especially achievable in those instances wherein the honeycomb core reinforcement is made of a metal (e.g., aluminum). Even in cases wherein the honeycomb core reinforcement is made of a glass fiber-reinforced or carbon fiber-reinforced material such as a glass fiber-reinforced phenolic composite or a carbon fiber-reinforced polyimide composite the quantity of fibrous material in the fabricated friction material product is small in comparison to a conventional fiber-reinforced friction material. For instance, a honeycomb core reinforced friction material fabricated using Mix 2 of Table 1 above utilized an embedded honeycomb core reinforcement made of 27.6% glass fiber by weight and 72.4% of phenolic resin by weight. Because the reinforcement core comprised only 10.8% by weight of the completed friction material, the actual fibrous material content of the reinforced friction material was only 2.98% by weight. This level of fiber content is significantly lower than the typical 20% or more fiber content of known fiber-reinforced friction materials.

The reinforced friction material made in accordance with the method of this invention is processed without the necessity of having to uniformly mix discontinuous fibers with powder (particulate) mixture constituents, and thus avoids a major cause of manufacturing quality fluctuation. A fiber-free mixing procedure is a much more efficient mixing process and results in a significantly improved consistency of quality.

Also, in wear-resistance testing to date the new reinforced friction material has shown considerably lower wear rates of 0.07% compared to 0.35% for a fiber-reinforced friction material under the same test conditions.

It is generally understood that the contact stiffness between the friction material and the rotor or drum affects the occurrence of brake noise. In order to eliminate or reduce the propensity of brake noise, it is often necessary to adjust the stiffness of the friction material to an optimum value. However, for conventional friction materials, this essentially means reformulation of the materials and may result in other adverse consequences. The current invention successfully solves this problem by incorporating honeycomb cores into friction materials. Once a mixture has been formulated for a particular application, the stiffness of the pad can be changed by adjusting the stiffness of the reinforcement core to avoid brake noise. The frictional characteristics of the pad will remain almost unchanged because the cured mixture covers most of the contact surface area.

Lastly, in conventional fiber-reinforced friction materials an uneven distribution of fibers often results in uneven brake rotor or brake drum wear treatment manifest by surface grooving. In comparison, Krauss and inertia dynamometer testing of the new reinforced friction material of our invention was noted to result in very smooth brake rotor wear.

Other suitable materials, component shapes, and component sizes may be utilized in the practice of this invention. Also, the reinforced friction material of this invention may be used in drum brake assemblies for automobiles, trucks, buses and off highway vehicles as well as in the disc and drum brake assemblies described hereinabove. Furthermore, the reinforced friction material of this invention may be utilized in industrial brake and clutch applications such as elevator brake assemblies, lawn mower vehicle brake and clutch assemblies, etc.

Since certain changes may be made in the above-described system and apparatus not departing from the scope of the invention herein and above, it is intended that all matter contained in the description or shown in the accompanying drawings shall be interpreted as illustrative and not in a limiting sense.

We claim our invention as follows:

1. In a method of fabricating a solidified, reinforced friction material shape, the steps of:

placing and evenly distributing a first measured quantity of a friction material mixture comprised of friction particles, filler particles, and organic polymer binder particles in a mold cavity having a planform shape corresponding to the planform of said friction material shape;

placing a non-metallic honeycomb core reinforcement in said mold cavity with complete penetration of only a lower portion of said non-metallic honeycomb core reinforcement through said evenly distributed first measured quantity of friction material mixture;

placing and evenly distributing a second measured quantity of said friction material mixture in said mold cavity to more than completely fill the upper portion of said non-metallic honeycomb core reinforcement and a zone above; and compressing said placed and evenly distributed friction material mixture measured quantities to an elevated isostatic pressure and elevating the temperature of said placed and evenly distributed friction material mixture measured quantities sufficiently to bond said friction material mixtures together and to said fiber-reinforced, non-metallic honeycomb core reinforcement by covalent bonds and electrostatic bonding to form said reinforced friction material shape.

2. The method defined by claim 1 wherein said non-metallic honeycomb core reinforcement placed in said mold cavity in penetrating relation to said friction material mixture is comprised of a cured, thermosetting polymer resin having an expanded bulk density in the range of from approximately 2 pounds per cubic foot to approximately 20 pounds per cubic foot.

3. The method defined by claim 1 wherein opposing cell walls of said honeycomb core reinforcement are spaced apart a distance of from about 1/16 inch to about 1 inch.

4. The method defined by claim 1 wherein said cell walls of said honeycomb core reinforcement have a diameter ranging from about 1/16 inch to about 1 inch.

5. In a method fabricating a reinforced friction material shape, the steps of:

placing a non-metallic honeycomb core reinforcement having open cells partially closed by a facing sheet into a mold cavity having a planform corresponding to the planform of said reinforced friction material shape;

placing and evenly distributing a measured quantity of a friction material comprised of friction particles, filler particles, and organic polymer binder particles in said mold cavity to more than completely fill said non-metallic honeycomb core reinforcement; and compressing said placed and evenly distributed friction material mixture to an elevated isostatic pressure and elevating the temperature of said placed and evenly distributed friction material and of said non-metallic honeycomb core reinforcement in said mold cavity sufficiently to bond said friction material mixture together and to said non-metallic honeycomb core reinforcement to form said reinforced friction material shape.

6. In a method of fabricating a hybrid disc brake friction pad having an inwardly-situated principal friction material area part fabricated with an embedded low-density honeycomb core reinforcement encased in a walled receptacle of compatible friction material, the steps of:

heating a first mold cavity having a planform corresponding to said principal friction material area;

placing and evenly distributing a first measured quantity of a friction material mixture comprised of friction particles, filler particles, and binder particles in said first mold cavity;

placing a honeycomb core reinforcement in said first mold cavity with complete penetration of only a lower portion of said honeycomb core reinforcement through said evenly distributed friction material mixture;

placing and evenly distributing a second measured quantity of said friction material mixture in said first mold cavity to completely fill the upper portion of said honeycomb core reinforcement;

compressing said placed and evenly distributed friction material mixture to an elevated isostatic pressure to form said inwardly-situated principal friction material area part;

removing said inwardly-situated principal friction material area part from said first mold cavity;

placing said inwardly-situated principal friction material area part in a second mold cavity having a planform corresponding to the planform of said hybrid disc brake friction pad;

placing and evenly distributing a measured quantity of a walled receptacle friction material mixture comprised of friction particles, filler particles, and binder particles around the perimeter and over one face of said inwardly-situated principal friction material area part; and compressing said placed and evenly distributed receptacle friction material mixtures to an elevated isostatic pressure and at a binder polymerization temperature to form said hybrid disc brake friction pad.

* * * * *